United States Patent

Boucher et al.

(10) Patent No.: US 11,480,103 B2
(45) Date of Patent: Oct. 25, 2022

(54) SUPERCRITICAL CO$_2$ CYCLE FOR GAS TURBINE ENGINES USING PARTIAL CORE EXHAUST FLOW

(71) Applicant: United Technologies Corporation, Farmington, CT (US)

(72) Inventors: Amanda J. L. Boucher, Boston, MA (US); Joseph B. Staubach, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 237 days.

(21) Appl. No.: 16/746,299

(22) Filed: Jan. 17, 2020

(65) Prior Publication Data

US 2021/0222619 A1 Jul. 22, 2021

(51) Int. Cl.
*F02C 6/18* (2006.01)
*F02C 1/05* (2006.01)
(Continued)

(52) U.S. Cl.
CPC ............ *F02C 6/18* (2013.01); *F01K 25/103* (2013.01); *F02C 1/05* (2013.01); *F02C 1/10* (2013.01); *F02K 3/06* (2013.01); *F02K 3/115* (2013.01); *F01K 23/10* (2013.01); *F02C 6/08* (2013.01); *F05D 2210/12* (2013.01); *F05D 2220/32* (2013.01); *F05D 2220/74* (2013.01);
(Continued)

(58) Field of Classification Search
CPC ............ F05D 2210/12; F05D 2220/32; F05D 2220/74; F05D 2260/20; F05D 2260/232; F01K 25/103; F01K 23/16; F01K 23/08; F01K 23/00; F01K 23/10; F01K 23/14; F02C 1/05; F02C 7/16; F02C 7/18; F02C 6/18
USPC .......................................... 60/616, 618, 655
See application file for complete search history.

(56) References Cited

U.S. PATENT DOCUMENTS

2013/0086906 A1 4/2013 Thomas
2015/0096300 A1 4/2015 Gurin
(Continued)

FOREIGN PATENT DOCUMENTS

EP 3048281 A1 7/2016
WO 2012057848 A1 5/2012

OTHER PUBLICATIONS

European Search Report for European Application No. 21151918.6, dated Jun. 16, 2021, 10 pages.

*Primary Examiner* — Mickey H France
(74) *Attorney, Agent, or Firm* — Cantor Colburn LLP

(57) ABSTRACT

Gas turbine engines are described. The gas turbine engines include a compressor section, a combustor section, a turbine section, a nozzle section, wherein the compressor section, the combustor section, the turbine section, and the nozzle section define a core flow path that expels through the nozzle section, and a waste heat recovery system. The waste heat recovery system includes a heat recovery heat exchanger arranged at the nozzle section, wherein the heat recovery heat exchanger is arranged within the nozzle section such that the heat recovery heat exchanger occupies less than an entire area of an exhaust area of the nozzle section and a heat rejection heat exchanger arranged to reduce a temperature of a working fluid of the waste heat recovery system.

20 Claims, 5 Drawing Sheets

(51) Int. Cl.

| | | |
|---|---|---|
| *F01K 25/10* | (2006.01) | |
| *F02C 1/10* | (2006.01) | |
| *F02K 3/06* | (2006.01) | |
| *F02K 3/115* | (2006.01) | |
| *F01K 23/10* | (2006.01) | |
| *F22B 3/08* | (2006.01) | |
| *F02C 6/08* | (2006.01) | |

(52) U.S. Cl.
CPC .... *F05D 2260/20* (2013.01); *F05D 2260/213* (2013.01); *F22B 3/08* (2013.01)

(56) References Cited

U.S. PATENT DOCUMENTS

| | | | |
|---|---|---|---|
| 2016/0369697 | A1 | 12/2016 | Schwarz et al. |
| 2017/0292412 | A1* | 10/2017 | Fonseca ................ F01D 15/005 |
| 2017/0356340 | A1 | 12/2017 | Vaisman et al. |
| 2018/0051716 | A1* | 2/2018 | Cheung ................... H02K 9/19 |
| 2018/0274441 | A1 | 9/2018 | Descubes et al. |
| 2018/0334959 | A1 | 11/2018 | Jagtap |
| 2019/0128184 | A1 | 5/2019 | Kim et al. |
| 2019/0128189 | A1 | 5/2019 | Rambo |
| 2019/0249599 | A1* | 8/2019 | Sen .......................... F02C 3/04 |

* cited by examiner

SUPERCRITICAL CO₂ CYCLE FOR GAS TURBINE ENGINES USING PARTIAL CORE EXHAUST FLOW

TECHNICAL FIELD

The present disclosure relates generally to systems for recovering waste heat in gas turbine engines, and more specifically to work recovery systems that utilize a supercritical $CO_2$ cycle to recover work from excess heat.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some configurations, a fan is also connected to the shaft and is driven to rotate via rotation of the turbine.

The compression process of the gas turbine engine results in a rise in the temperature of the gas at the compressor exit due to increasing pressure and component inefficiencies. At certain elevated pressures, the compressed air may become hotter than desirable for the purposes of turbine cooling and it is desirable to cool the compressed air prior to being used as a cooling fluid within the gas turbine engine. The waste heat that is generated (extracted) from this cooled cooling air is imparted to the exhaust flow and expelled without providing additional work. Waste heat is a source of loss (inefficiency) in a thermodynamic cycle, and reduction of waste heat in an engine therefore increases the efficiency of the engine.

BRIEF SUMMARY

According to some embodiments, gas turbine engines are provided. The gas turbine engines include a compressor section, a combustor section, a turbine section, a nozzle section, wherein the compressor section, the combustor section, the turbine section, and the nozzle section define a core flow path that expels through the nozzle section, and a waste heat recovery system. The waste heat recovery system includes a heat recovery heat exchanger arranged at the nozzle section, wherein the heat recovery heat exchanger is arranged within the nozzle section such that the heat recovery heat exchanger occupies less than an entire area of an exhaust area of the nozzle section and a heat rejection heat exchanger arranged to reduce a temperature of a working fluid of the waste heat recovery system.

In addition to one or more of the features described above, or as an alternative, further embodiments of the gas turbine engines may include that the waste heat recovery system includes a supercritical $CO_2$ ($sCO_2$) work recovery cycle system.

In addition to one or more of the features described above, or as an alternative, further embodiments of the gas turbine engines may include that a portion of the heat recovery heat exchanger is located within a strut of the nozzle section.

In addition to one or more of the features described above, or as an alternative, further embodiments of the gas turbine engines may include that a portion of the heat recovery heat exchanger is located on or within a tail cone of the nozzle section.

In addition to one or more of the features described above, or as an alternative, further embodiments of the gas turbine engines may include that a portion of the heat recovery heat exchanger is located on or within a nozzle case of the nozzle section.

In addition to one or more of the features described above, or as an alternative, further embodiments of the gas turbine engines may include that the waste heat recovery system further includes a turbine and a compressor. The turbine and the compressor of the waste heat recovery system are configured to generate work.

In addition to one or more of the features described above, or as an alternative, further embodiments of the gas turbine engines may include a power line operably connected to an output of the turbine of the waste heat recovery system.

In addition to one or more of the features described above, or as an alternative, further embodiments of the gas turbine engines may include that the heat recovery heat exchanger occupies 80% or less of an exhaust area of the nozzle section.

In addition to one or more of the features described above, or as an alternative, further embodiments of the gas turbine engines may include that the heat recovery heat exchanger is non-annular in shape.

In addition to one or more of the features described above, or as an alternative, further embodiments of the gas turbine engines may include that the waste heat recovery system further comprises a recuperating heat exchanger.

According to some embodiments, gas turbine engines are provided. The gas turbine engines include a nozzle section and a waste heat recovery system. The waste heat recovery system includes a heat rejection heat exchanger thermally connected to a portion of a flow path of the gas turbine engine, the heat rejection heat exchanger being a working fluid-to-air heat exchanger, a recuperating heat exchanger being a working fluid-to-working fluid heat exchanger, a heat recovery heat exchanger arranged at the nozzle section, wherein the heat recovery heat exchanger being a working fluid-to-exhaust heat exchanger, wherein the heat recovery heat exchanger arranged at the nozzle section, wherein the heat recovery heat exchanger is arranged within the nozzle section such that the heat recovery heat exchanger occupies less than an entire area of an exhaust area of the nozzle section, and a working fluid within the waste heat recovery system configured to flow through each of the heat rejection heat exchanger, the recuperating heat exchanger, and the heat recovery heat exchanger.

In addition to one or more of the features described above, or as an alternative, further embodiments of the gas turbine engines may include that the working fluid is supercritical $CO_2$ ($sCO_2$).

In addition to one or more of the features described above, or as an alternative, further embodiments of the gas turbine engines may include that a portion of the heat recovery heat exchanger is located within a strut of the nozzle section.

In addition to one or more of the features described above, or as an alternative, further embodiments of the gas turbine engines may include that a portion of the heat recovery heat exchanger is located on or within a tail cone of the nozzle section.

In addition to one or more of the features described above, or as an alternative, further embodiments of the gas turbine engines may include that a portion of the heat recovery heat exchanger is located on or within a nozzle case of the nozzle section.

In addition to one or more of the features described above, or as an alternative, further embodiments of the gas turbine engines may include that the waste heat recovery system further includes a turbine and a compressor. The turbine and the compressor of the waste heat recovery system are configured to generate work.

In addition to one or more of the features described above, or as an alternative, further embodiments of the gas turbine engines may include a power line operably connected to an output of the turbine of the waste heat recovery system.

In addition to one or more of the features described above, or as an alternative, further embodiments of the gas turbine engines may include that the heat recovery heat exchanger occupies 80% or less of an exhaust area of the nozzle section.

In addition to one or more of the features described above, or as an alternative, further embodiments of the gas turbine engines may include that the heat recovery heat exchanger is non-annular in shape.

In addition to one or more of the features described above, or as an alternative, further embodiments of the gas turbine engines may include a compressor section, a combustor section, and a turbine section. The compressor section, the combustor section, the turbine section, and the nozzle section define a core flow path that expels through the nozzle section.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
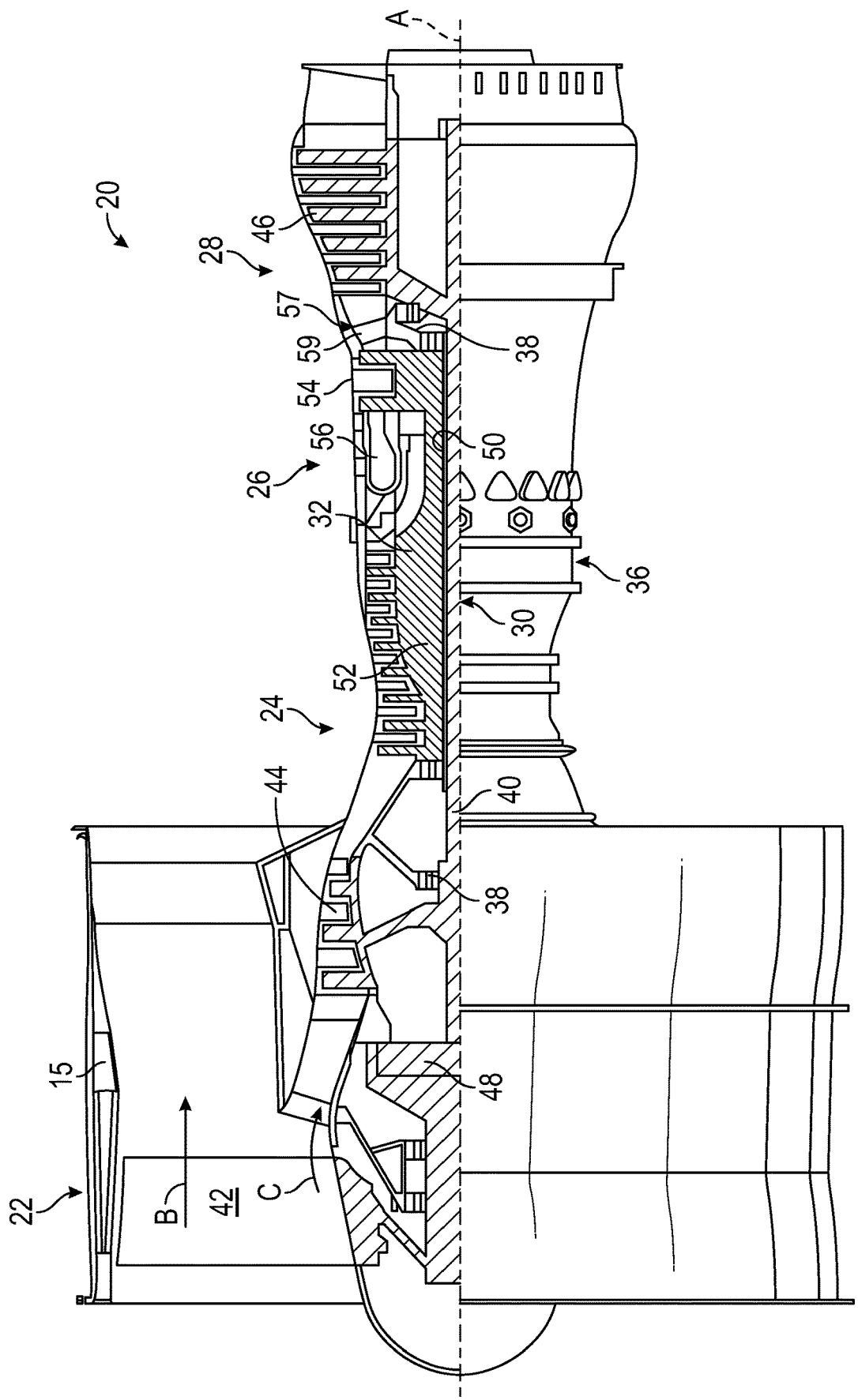
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined within a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines.

Figure 2:
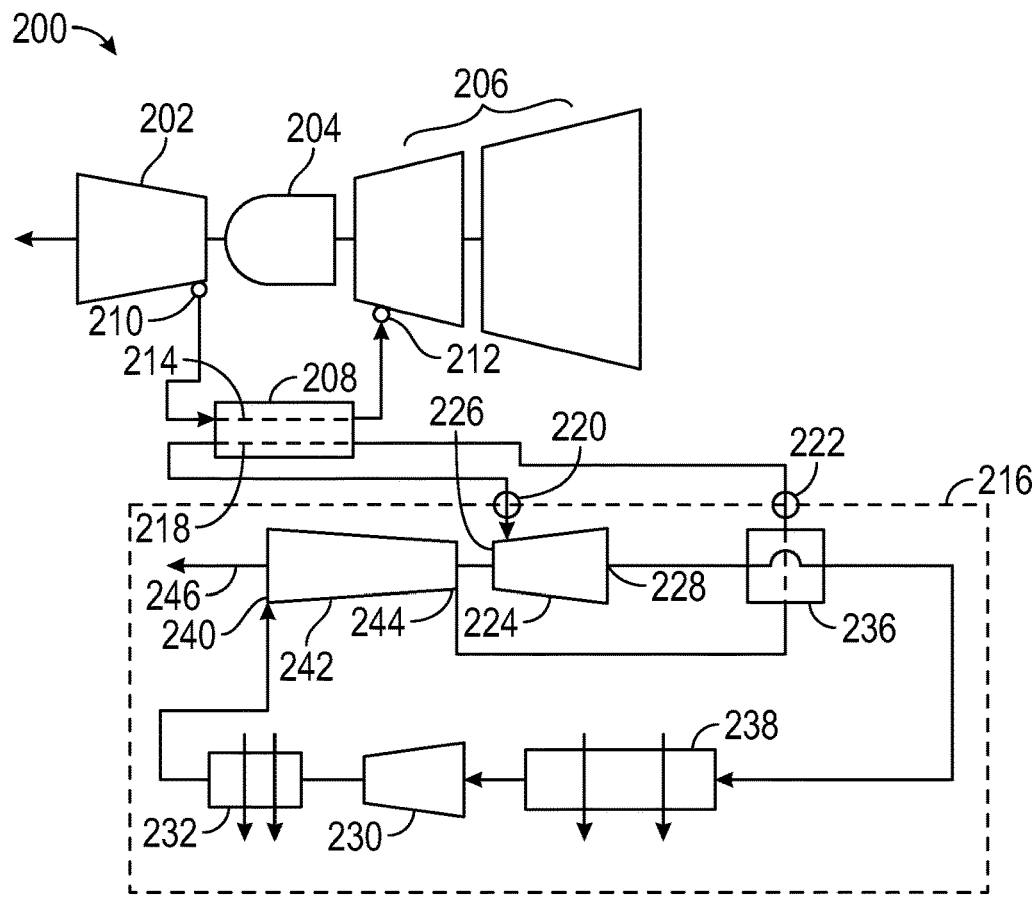
FIG. 2 is a schematic illustration of a gas turbine engine including a cooled cooling air driven over-expanding, recuperating supercritical $CO_2$ cycle that may incorporate embodiments of the present disclosure.

Turning now to FIG. 2, a schematic illustration of a gas turbine engine 200, including a compressor section 202, a combustor section 204, and a turbine section 206, all of which are connected via a primary fluid flow path, is shown. The gas turbine engine 200 may have, for example, a similar structure and configuration as that shown and described with respect to FIG. 1. The turbine cooling air is employed to provide cooling to the turbines and other components of the gas turbine engine 200.

To recapture the waste heat within the gas turbine engine 200 and convert such waste heat to work, a waste heat recovery heat exchanger 208 is connected to a compressor bleed port 210 and a turbine inlet 212. The waste heat recovery heat exchanger 208 provides a hot flow path 214 that connects the compressor bleed port 210 to the turbine inlet 212. As such, the hot flow path 214 bypasses the combustor section 204. In one non-limiting example, the compressor bleed port 210 is located at or downstream of an aft most compressor stage of the compressor section 202. Further, in some embodiments, the turbine inlet 212 is arranged at or upstream of the upstream-most turbine stage of the turbine section 206.

As the air from the compressor bleed port 210 is passed through the waste heat recovery heat exchanger 208, a portion of the heat in the bypassed air may be extracted at the waste heat recovery heat exchanger 208. The heat extracted from the hot flow path 214 provides the air at the turbine inlet 212 to be at an appropriate pressure and temperature to be used to cool portions of the turbine section 206. The waste heat recovery heat exchanger 208 extracts heat from the air bled from the compressor section 202 and provides the extracted heat to a waste heat recovery system 216. The waste heat recovery system 216 is configured to use the waste heat to generate work and provide the generated work to one or more engine systems within the gas turbine engine 200 and/or to other systems of an aircraft. The waste heat recovery heat exchanger 208 includes the hot flow path 214 (may be a first fluid path) that connects the compressor bleed port 210 to the turbine inlet 212, and a cold flow path 218 (may be a second fluid path) that connects an inlet 220 of the waste heat recovery system 216 and an outlet 222 of the waste heat recovery system 216.

Within the waste heat recovery heat exchanger 208, heat is transferred from air within the hot flow path 214 to working fluid within the cold flow path 218. The cold flow path 218 is connected to the waste heat recovery system 216. In some embodiments, the waste heat recovery system 216 is configured as a supercritical $CO_2$ ($sCO_2$) Brayton cycle. The waste heat recovery system 216 converts the extracted heat into work (e.g., rotational work and/or electrical) which is provided to at least one additional engine system of the gas turbine engine 200. The waste heat recovery system 216 includes a working fluid (e.g., $sCO_2$) that is retained and used within a closed-loop system (e.g., within the waste heat recovery system 216). The waste heat recovery system 216 recuperates waste heat and expands the $sCO_2$ working fluid below the supercritical pressure during a working cycle. Such expansion of the $sCO_2$ is referred to as an over-expanded recuperating work recovery cycle.

In the illustrative configuration, included within the waste heat recovery system 216 is a turbine 224 with an inlet 226 connected to an output of the waste heat recovery heat exchanger 208. The turbine 224 is configured to expand the heated working fluid and expels the heated working fluid through a turbine outlet 228. The turbine 224 may be configured to expand the working fluid beyond an expansion that would place the working fluid back at, or just above, the supercritical point prior to a beginning of a working fluid cycle. This expansion may be referred to as over-expansion. As a result of the over-expansion, a secondary compressor 230 and a second heat rejection heat exchanger 232 are, optionally, included within the working cycle of the waste heat recovery system 216 to return the working fluid ($sCO_2$) to a pressure and temperature required to achieve a supercritical state at the beginning of a working cycle.

From the turbine 224, the expelled working fluid is passed through a relatively hot passage of a recuperating heat exchanger 236. The working fluid is then passed to a relatively hot passage of a first heat rejection heat exchanger 238. After passing through the first heat rejection heat exchanger 238, the working fluid is passed to the secondary compressor 230 and the second heat rejection heat exchanger 232. The working fluid is then passed to an inlet 240 of a compressor 242 (alternately referred to as a working fluid compressor 242). The compressor 242 is configured to compress the working fluid and direct the compressed working fluid from a compressor outlet 244 to a cold passage of the recuperating heat exchanger 236. In practical terms, the location of the inlet 240 of the working fluid compressor 242 is referred to as the start of the working fluid cycle.

During operation of the waste heat recovery system 216, the compressor 242 compresses the working fluid, and passes the compressed working fluid through the recuperating heat exchanger 236 and the waste heat recovery heat exchanger 208, causing the compressed working fluid to be heated. The heated working fluid is provided to the inlet 226 of the turbine 224 and expanded through the turbine 224, driving the turbine 224 to rotate. As described above, the turbine 224 is configured to over-expand the working fluid beyond a point that would return the working fluid to the state of the working fluid at the beginning of the cycle. The rotation of the turbine 224 drives rotation of the compressor 242, the over-expansion compressor 230, and an output shaft 246. The output shaft 246 is mechanically connected or coupled to one or more additional turbine engine systems. The coupling of the output shaft 246 provides work to the connected systems using any conventional means for transmitting rotational work. Additionally, in some embodiments and configurations, the rotational work can be converted into electricity and used to power one or more engine or aircraft systems. By way of example, transmitting rotational work can include a drive shaft, a gear system, an electrical generator and distribution system, or any similar structure (s). In the illustrated example, the working fluid is a $CO_2$ fluid that is maintained at or above a supercritical point throughout the entirety of the working cycle. Due to being maintained at or above the supercritical point, the waste heat recovery system 216 may be referred to as a supercritical $CO_2$ cycle ($sCO_2$ cycle).

Figure 3:
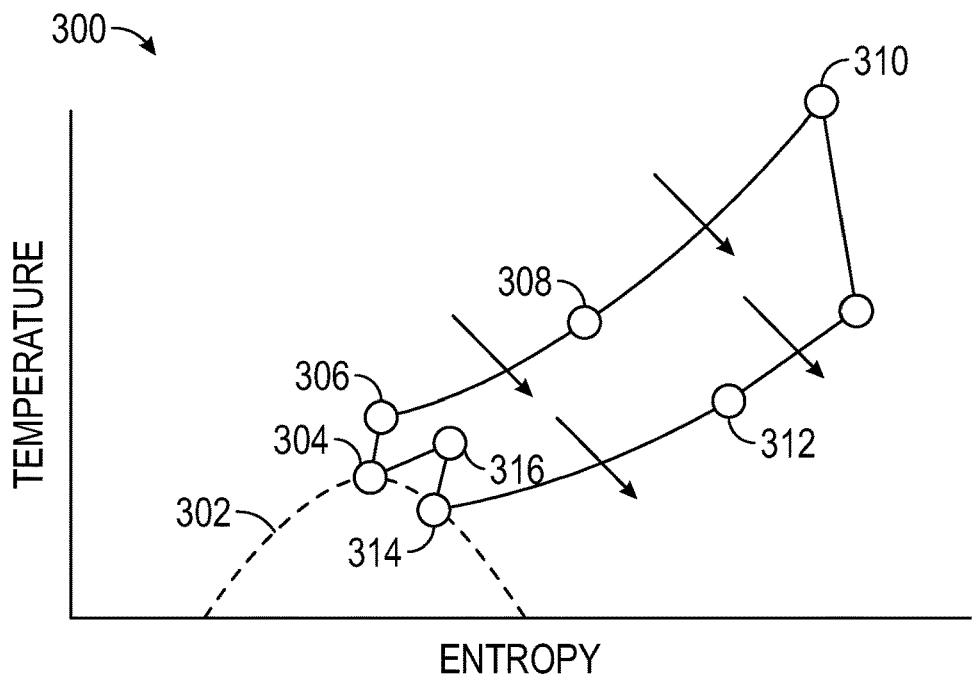
FIG. 3 illustrates a recuperating supercritical $CO_2$ cycle diagram.

Referring now to FIG. 3, a chart 300 illustratively shows a state of a working fluid throughout a working cycle of a waste heat recovery system in accordance with an embodiment of the present disclosure. For example, chart 300 may represent a state plot of a working fluid within the waste heat recovery system 216 shown in FIG. 2. The chart 300 illustrates the relationship of temperature with respect to entropy of the working fluid. Initially, the working fluid starts at or above a peak of a vapor dome 302 at a starting point 304. The vapor dome 302 represents an upper boundary above which the working fluid is at the corresponding supercritical point. Reference will be made, for explanatory purposes, with respect to the waste heat recovery system 216 shown in FIG. 2. For example, the starting point 304 is the state of the working fluid at, for example, the inlet of the compressor 242, prior to the working fluid undergoing compression by the compressor 242.

As noted, the working fluid is compressed in the compressor 242, causing the temperature and pressure of the working fluid to increase, while also imparting a minimal increase in the entropy of the working fluid until the working fluid is expelled from the compressor 242. Point 306 of the chart 300 represents the state of the working fluid at the compressor outlet 244. After exiting the compressor 242, the working fluid is passed through the recuperating heat exchanger 236, where the temperature and entropy of the working fluid are increased to point 308, at an outlet of the recuperating heat exchanger 236.

The working fluid is then passed from the outlet of the recuperating heat exchanger 236 to the waste heat recovery heat exchanger 208. Within the waste heat recovery heat exchanger 208, the entropy and temperature of the working fluid are increased to a point 310 on chart 300. The point 310 represents the state of the working fluid at the outlet of the waste heat recovery heat exchanger 208 and at the inlet 226 of the turbine 228. Further, the point 310 represents the peak temperature and entropy of the working fluid in the cycle.

As power is extracted from the working fluid in the turbine 224, the temperature and pressure of the working fluid will drop. The pressure is reduced below the level of the start of the cycle (point 304) and needs to be compressed back up to the pressure at the starting point 304. The over-expansion in the turbine 224 allows for additional work extraction compared to expanding to the pressure of the start of the cycle (point 304). After work has been extracted by the turbine 224, the over-expanded working fluid is provided to the recuperating heat exchanger 236 and a portion of the excess heat is transferred from the expanded working fluid to working fluid between points 306 and 308 of the chart 300 (representative of the cycle). The state of the working fluid at the outlet of the recuperating heat exchanger 236 and the inlet of the first heat rejection heat exchanger 238 is illustrated at point 312.

To improve operations of the waste heat recovery system 216, the waste heat recovery system 216 employs the second heat rejection heat exchanger 232 to return the state of the working fluid to as close to the starting point 304 as possible. Due to the over-expansion at the turbine 224, the pressure of the working fluid at an outlet of the heat rejection heat exchanger 238 (point 314) is lower than required to maintain the working fluid at a supercritical point at the start of the working fluid cycle. To address this, the working fluid is pressurized in the secondary compressor 230. The pressurization results in a pressure and temperature of the working fluid at an outlet (point 316) of the secondary compressor 230 being above that which is required to maintain the supercritical state of the working fluid. The second heat rejection heat exchanger 232 is used to transfer waste heat in a similar manner as the first heat rejection heat exchanger 238, and returns the working fluid to the inlet 240 of the working fluid compressor 242. The waste heat can be transferred into any number of heat sinks within the gas turbine engine including, but not limited to, fan duct air, ram air, fuel, and a transcritical $CO_2$ refrigeration cycle. The multiple stages of compression, with heat rejection in between, creates an intercooled compression that increases the bottoming cycle efficiency.

In the illustrated example presented in chart 300 of FIG. 3, the starting point 304 of the cycle is immediately at the vapor dome 302. In practical examples, the starting point can be targeted at slightly above the vapor dome in order to prevent minor variations during operation and other practical considerations from causing the working fluid to fall below the vapor dome 302.

In certain situations and/or configurations heat exchanger pressure losses and size may be concerns, especially with respect to the first and/or second heat rejection heat exchangers 232, 238 shown in FIG. 2. In some configurations of the waste heat recovery systems described above (e.g., a supercritical $CO_2$ bottoming cycle concept), if the waste heat is transferred into a fan duct or ram air via a heat rejection heat exchanger to return the working fluid to its starting point temperature, then there is a limited pressure drop available for the cold side of the heat exchanger (e.g., second heat rejection heat exchanger 232 shown in FIG. 2).

A higher pressure drop would allow for a more compact, lighter weight second heat exchanger. Also, in a low fan pressure ratio stream, air will not naturally enter the second heat exchanger without extensive baffling, which can incur additional pressure losses and weight.

In some configurations, the secondary compressor (230) and/or the second heat rejection heat exchanger (232), described with respect to FIG. 2, may be optional components in the system (e.g., may be removed or not necessary in certain configurations). Further, the cooler exchanger (208), in some embodiments, may be arranged within a bypass flow stream that is not part of the hot section of a gas turbine engine. For example, in some embodiments, the cooler exchanger may be arranged within or along the bypass flow path B in a bypass duct, as shown in FIG. 1. In some embodiments, the heat rejection heat exchanger may be a working fluid-to-air heat exchanger, the recuperating heat exchanger may be a working fluid-to-working fluid heat exchanger, and the heat recovery heat exchanger may be a working fluid-to-exhaust heat exchanger. In some such embodiments, the heat recovery heat exchanger may be arranged proximate or near a core nozzle (e.g., downstream from a low pressure turbine of a gas turbine engine).

Figure 4A:
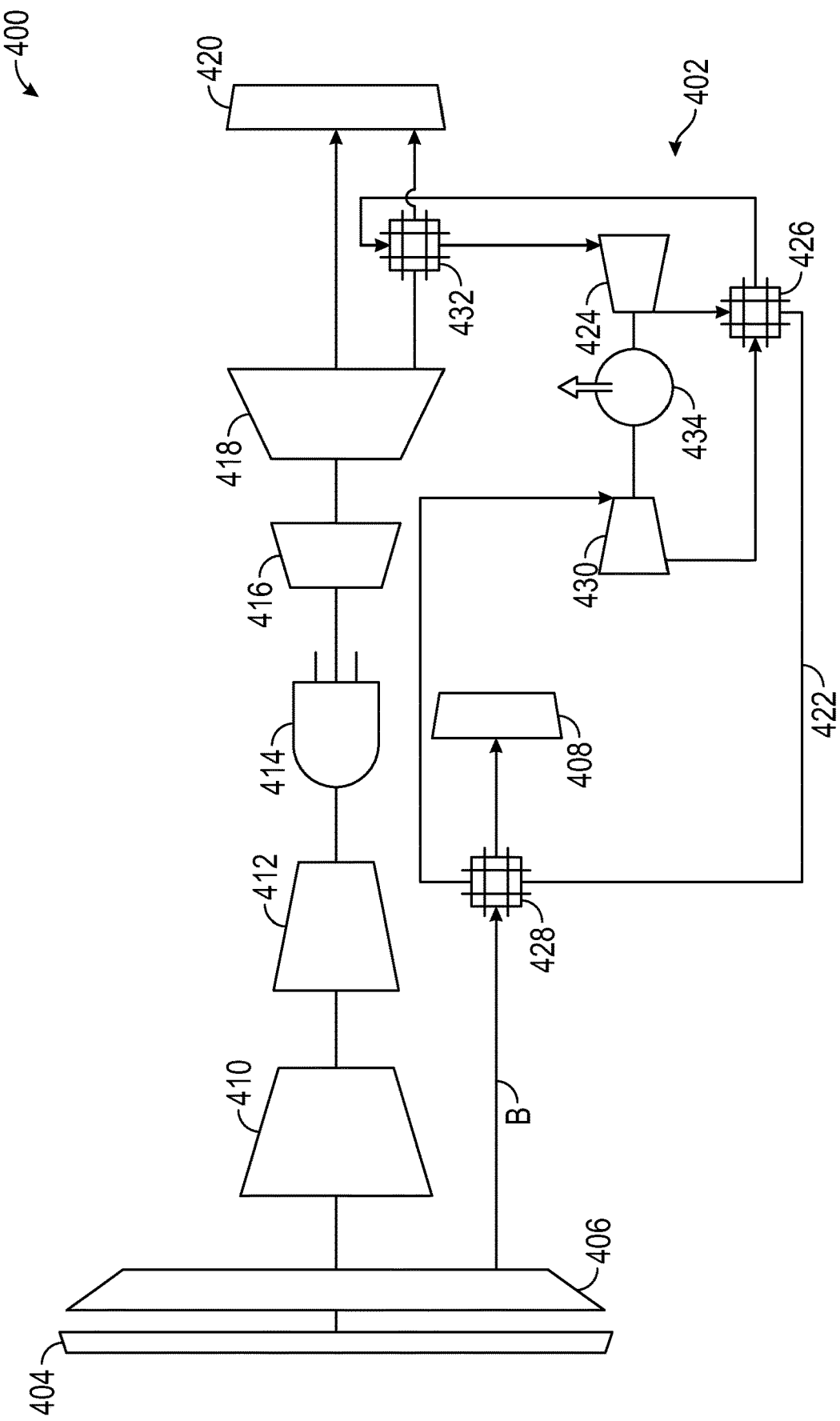
FIG. 4A is a schematic diagram of a gas turbine engine in accordance with an embodiment of the present disclosure.
Figure 4B:
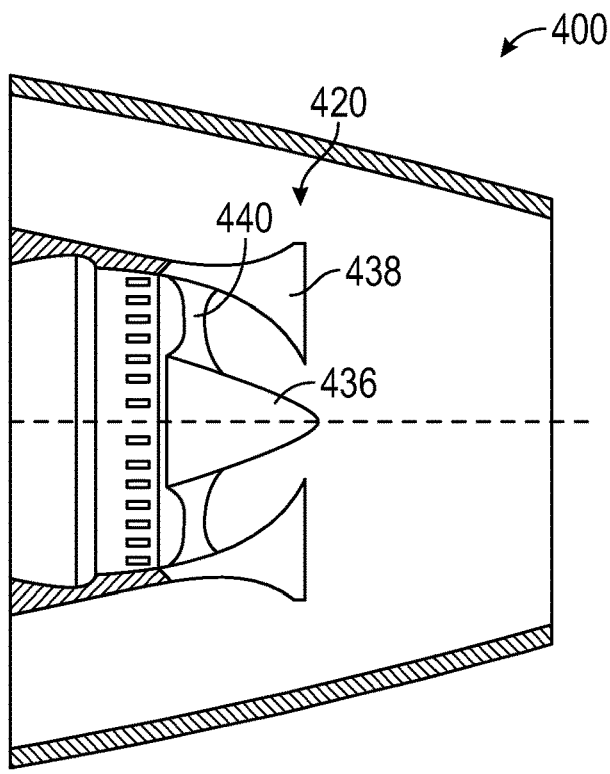
FIG. 4B is a schematic illustration of a nozzle section of the gas turbine engine of FIG. 4A.
Figure 4C:
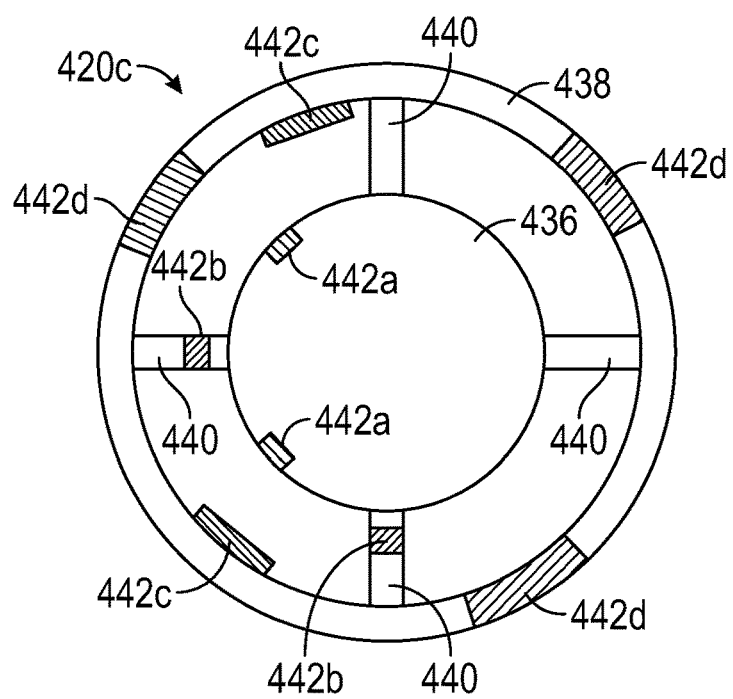
FIG. 4C is a schematic illustration of the nozzle section shown in FIG. 4B illustrating various locations of portions of a waste heat recovery heat exchanger in accordance with an embodiment of the present disclosure.

For example, turning now to FIGS. 4A-4C, a schematic diagram of a gas turbine engine 400 in accordance with an embodiment of the present disclosure is shown. The gas turbine engine 400 may be similar to that shown and described above, and may include a waste heat recovery system 402. The gas turbine engine 400 includes an inlet 404, a fan 406 with a fan nozzle 408, a low pressure compressor 410, a high pressure compressor 412, a combustor 414, a high pressure turbine 416, a low pressure turbine 418, and a core nozzle 420. A bypass flow path B may be defined within a bypass duct defined within a nacelle, as described above.

In this configuration, the waste heat recovery system 402 includes a $sCO_2$ flow path 422 that may be a closed-loop system of $CO_2$ that is cycled to extract additional work from waste heat of the gas turbine engine 400, such as described above. The waste heat recovery system 402 includes (in a flow path/cycle direction) a turbine 424, a recuperating heat exchanger 426, a heat rejection heat exchanger 428, a compressor 430, and a heat recovery heat exchanger 432. The turbine 424 is coupled to a power line 434 (e.g., a drive shaft) that can output work. For example, the power line 434 may be connected to a generator (e.g., to generate electricity) or mechanically connected to a fan to drive rotation of the fan (e.g., mechanical work). In some embodiments, the heat recovery heat exchanger 432 is a heat exchanger that is arranged between the low pressure turbine 418 and the core nozzle 420, and thus provides a thermal exchanger between a working fluid within the flow path 422 and an exhaust of the gas turbine engine 400.

The configuration of the gas turbine engine 400, and the waste heat recovery system 402 thereof, modifies the supercritical $CO_2$ bottoming cycle concept. That is, as shown in FIG. 4A, the heat recovery heat exchanger 432 is located in the exhaust stream of the gas turbine engine 400. That is, heat recovery heat exchanger 432 is located proximate the core nozzle 420 and downstream of the low pressure turbine 418. Typically, the heat rejection heat exchanger may be an annular or circular heat exchanger that is arranged directly within the core exhaust stream as the hot air exits the low pressure turbine 418 and is expelled through the core nozzle 420. Such heat rejection heat exchangers may be full circumference heat exchangers arranged about an engine axis and arranged to receive most or all of the hot air downstream from the low pressure turbine 418.

However, in accordance with embodiments of the present disclosure, rather than a full circumference or full annular heat exchanger, the heat recovery heat exchanger 432 of some embodiments is only a partial circumference, partial annular, or non-annular structure. In some embodiments, full circumference or full annular heat exchangers may be employed, but with a less-than full radial extent such that the entire outflow or exhaust of the engine does not pass through the heat exchanger. In some such embodiments, the heat recovery heat exchanger 432 may be configured or installed into either the exhaust walls, the exhaust cone, the struts, or the turbine exit guide vanes. As such, only a portion of the exhaust stream massflow passes through the heat recovery heat exchanger 432, rather than all of the exhaust stream, as previously done.

For example, as shown in FIGS. 4B-4C, various locations of a heat rejection heat exchanger in accordance with one or more embodiments of the present disclosure are shown. FIG. 4B illustrates a schematic cross-section of a core nozzle section of the gas turbine engine 400, and FIG. 4C illustrates and end-on view of the core nozzle section of the gas turbine engine 400. As shown in FIG. 4B, the core nozzle section includes a core nozzle 420 having a tail cone 436 arranged within a nozzle case 438 and supported by one or more struts 440. The tail cone 436 and nozzle case 438 are arranged to direct an exhaust out an end of the gas turbine engine 400. The nozzle case 438 may thus define exhaust walls along which a portion of the exhaust will pass.

FIG. 4C illustrates various different locations of the heat recovery heat exchanger 432 shown in FIG. 4A (illustrated on a variation of the core nozzle 420c). For example, one or more portions of the heat recovery heat exchanger 432 may be installed within or on the tail cone 436, illustrated at configuration 442a. In some configurations, in combination or alternatively to the other locations, one or more portions of the heat recovery heat exchanger 432 may be installed within or on the struts 440, illustrated at configurations 442b. Further, in some configurations, in combination or alternatively to the other locations, one or more portions of the heat recovery heat exchanger 432 may be installed on an exhaust wall defined by the nozzle case 438, illustrated at configurations 442c. Further, in some configurations, in combination or alternatively to the other locations, one or more portions of the heat recovery heat exchanger 432 may be installed in an exhaust wall defined by the nozzle case 438, illustrated at configurations 442d. It will be appreciated that in each instance or configuration 442a-d, the heat recovery heat exchanger 432 is a non-annular structure (e.g., does not form a full annular or circumferential structure) and comprises one or more portions or parts that are installed at specific locations about the core nozzle 420c. That is, rather than being a full circular heat exchanger arranged about a center axis of a gas turbine engine, the heat recovery heat exchanger of the present disclosure is less-than full-circle or full-circumferential, and thus may be smaller and/or more compact than prior full-circumferential (full annular) heat recovery heat exchangers.

Figure 4D:
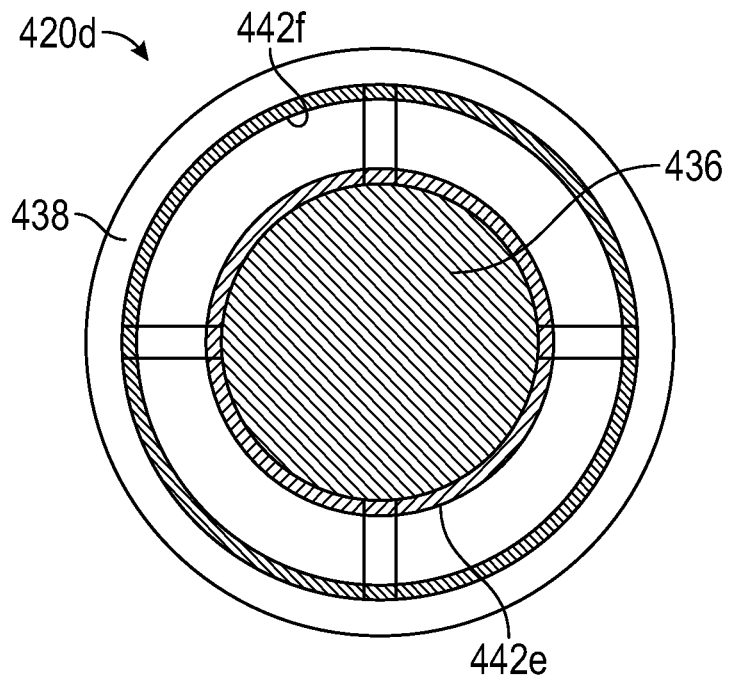
FIG. 4D is a schematic illustration of the nozzle section shown in FIG. 4B illustrating various locations of portions of a waste heat recovery heat exchanger in accordance with an embodiment of the present disclosure.

Turning to FIG. 4D, an alternative arrangement of the core nozzle 420d is shown. In this configuration, the heat recovery heat exchanger 432 (of FIG. 4A) is an annular structure (e.g., forms a full annular or circumferential structure). However, the configurations are less-than complete radially annular structures, as shown at configurations 442e, 422f. The configuration 442e illustrates an annular heat exchanger that is mounted to an exterior surface or outer diameter of the tail cone 436, but does not extend radially (relative to an engine axis) to an interior surface or inner diameter of the nozzle case 438. The configuration 442f illustrates an annular heat exchanger that is mounted to an interior surface or inner diameter of the nozzle case 438, but does not extend radially (relative to an engine axis) to an exterior surface or outer diameter of the tail cone 436.

It will be appreciated that the heat recovery heat exchanger may include one or more portions as shown and described with respect to FIGS. 4C-4D, in combination or some alternative configuration thereof. Further, in some embodiments, one or more additional portions and/or alternative portions may be arranged relative to the low pressure turbine or elements thereof. For example, in some such arrangements, one or more portions of the heat recovery heat exchanger may be arranged in or on turbine exit guide vanes, struts, shell, wall, or case of the turbine exit structure within the gas turbine engine.

In accordance with embodiments described herein, by arranging the heat recovery heat exchanger 432 as described and shown in FIGS. 4A-4D, the heat recovery heat exchanger 432 can be designed based on a lower hot side massflow. Such lower hot side massflow provides the $sCO_2$ bottoming cycle subsystem to be co-optimized, resulting more compact and lighter weight heat exchangers for the $sCO_2$ heater and cooler heat exchangers. It is noted that these two heat exchanger are typically the two highest weight components in the subsystem. Co-optimization of the $sCO_2$ bottoming cycle integrated with the main engine cycle can then determine the portion of core exhaust flow to be utilized for waste heat recovery.

As noted, the heat recovery heat exchangers of the present disclosure are configured to be located within the nozzle portion of a gas turbine engine. In contrast to conventional configurations, the heat recovery heat exchangers of the present disclosure allow a portion of the exhaust to exit the nozzle without being impeded by or passing though the heat recovery heat exchanger(s). Accordingly, the heat recovery heat exchangers of the present disclosure are arranged to have less-than complete coverage or blockage of the exhaust nozzle outlet area, and thus allow for a portion of the exhaust flow to exit unimpeded by the heat recovery heat exchanger (s).

Figure 5:
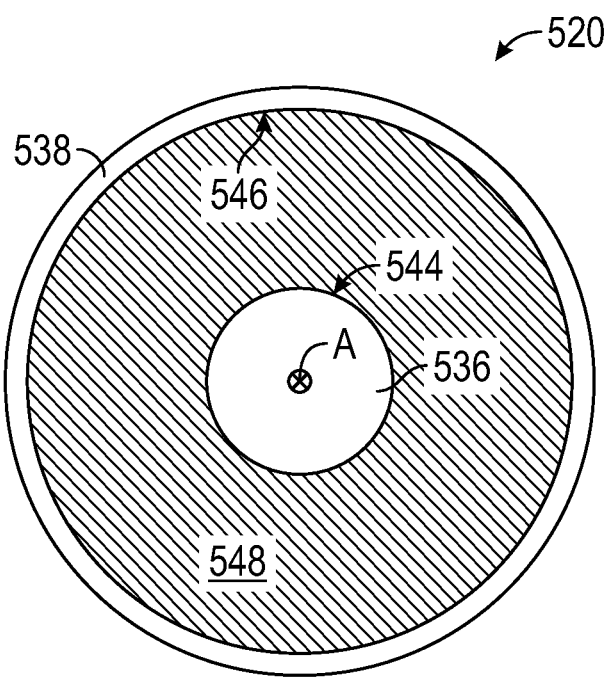
FIG. 5 is a schematic illustration of a nozzle section of a gas turbine engine.

Turning to FIG. 5, a schematic illustration of a core nozzle 520 in accordance with an embodiment of the present disclosure is shown. The core nozzle 520 includes a nozzle case 538 and a tail cone 536. The tail cone 536 is arranged within the nozzle case 538, or stated another way, the nozzle case 538 is arranged radially outward from the tail cone 536, relative to an engine central longitudinal axis A. The tail cone 536 has an outer diameter or external surface 544 and the nozzle case 538 has an inner diameter or internal surface 546. An exhaust area 548 is defined at the area between the external surface 544 of the tail cone 536 and the internal surface 546 of the nozzle case 538 (illustratively shown as stippling between the external surface 544 and the internal surface 546). It will be appreciated that the nozzle case 538 may be connected to the tail cone 536 by one or more struts or other structures, which may be located at a different axial position than a heat exchanger.

In conventional configurations, 100% or near to 100% of the exhaust area 548 would be occupied by a heat recovery heat exchanger in a gas turbine engine. That is, all or nearly all of the exhaust would pass through and be impeded by the full-area heat recovery heat exchangers. However, in contrast, embodiments of the present disclosure are directed to heat recovery heat exchangers that occupy less area, and thus have reduced weight and allow a portion of the exhaust to exit unimpeded. In some embodiments, the heat recovery heat exchangers of the present disclosure may be configured to occupy 80% or less of the exhaust area 548. Further, in some embodiments, the heat recovery heat exchangers of the present disclosure may be configured to occupy between 20% and 80% of the exhaust area 548. The reduced coverage or blockage of the heat recovery heat exchangers of the present disclosure is true, regardless of the specific configuration, geometry, etc.

By arranging the heat recovery heat exchanger as one or more portions around the core nozzle provides partitioning only a portion of the core flow for waste heat recovery. As such, a more compact, lighter weight heat exchanger and system may be achieved. Further, in accordance with some embodiments, the system design also allows the heat recovery heat exchanger to recover more heat per volume and weight. Advantageously, the more compact, lighter weight heat exchangers make the $sCO_2$ bottoming cycle a feasible size for engine integration. For example, by reducing the amount of area occupied by a heat exchanger within an exhaust of a gas turbine engine (e.g., 80% or less), the amount of weight may be reduced, thus providing advantages over prior configurations. That is, by occupying less than an entire area of an exhaust area of the nozzle section, weight savings may be achieved. Moreover, the reduced occupied area (i.e., less than the entire area at the exhaust) may enable more thrust to exit the engine without being impeded by the heat exchanger, and thus greater thrust may be achieved through implementation of embodiments described herein.

While described above in conjunction with a geared turbofan engine, it is appreciated that the waste heat recovery systems described herein can be utilized in conjunction with any type of turbine engine including a cooled cooling air system with only minor modifications that are achievable by one of skill in the art. The cooled cooling air systems described herein provide a main engine architecture that drives to high pressures by reducing the temperature of the turbine cooling air. Further, the systems described herein provide recovery of some work from the cooled cooling air system that is normally transferred into a heat sink. Additionally, the mass flow of the working fluid (e.g., $CO_2$) in the system described above, and therefore all the component volumes, may be sized specifically to provide a desired amount of cooling necessary to reduce the temperature of the turbine cooling air. For example, in some configurations and embodiments, the bleed turbine air will be on the order of 5% of core flow. A further benefit of the waste heat recovery systems described herein is that due to the high density and heat capacity of supercritical $CO_2$, a higher level of compaction can be achieved relative to comparable air systems for cooled cooling air. This is significant for weight and engine integration.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A gas turbine engine comprising:
   a compressor section;
   a combustor section;
   a turbine section;
   a nozzle section, wherein the compressor section, the combustor section, the turbine section, and the nozzle section define a core flow path that expels through the nozzle section; and
   a waste heat recovery system comprising:
   a heat recovery heat exchanger arranged at the nozzle section, wherein the heat recovery heat exchanger is arranged within the nozzle section such that the heat recovery heat exchanger occupies less than an entire area of an exhaust area of the nozzle section; and
   a heat rejection heat exchanger arranged to reduce a temperature of a working fluid of the waste heat recovery system,
   wherein the heat recovery heat exchanger comprises a plurality of heat exchanger portions distributed about the nozzle section in a non-annular arrangement.

2. The gas turbine engine of claim 1, wherein the waste heat recovery system includes a supercritical $CO_2$ ($sCO_2$) work recovery cycle system.

3. The gas turbine engine of claim 1, wherein a portion of the heat recovery heat exchanger is located within a strut of the nozzle section.

4. The gas turbine engine of claim 1, wherein a portion of the heat recovery heat exchanger is located on or within a tail cone of the nozzle section.

5. The gas turbine engine of claim 1, wherein a portion of the heat recovery heat exchanger is located on or within a nozzle case of the nozzle section.

6. The gas turbine engine of claim 1, wherein the waste heat recovery system further comprises:
   a turbine; and
   a compressor,
   wherein the turbine and the compressor of the waste heat recovery system are configured to generate work.

7. The gas turbine engine of claim 6, further comprising a power line operably connected to an output of the turbine of the waste heat recovery system.

8. The gas turbine engine of claim 1, wherein the heat recovery heat exchanger occupies 80% or less of an exhaust area of the nozzle section, wherein the exhaust area is defined as the area between an external surface of a tail cone of the nozzle section and an internal surface of a nozzle case of the nozzle section.

9. The gas turbine engine of claim 1, wherein the plurality of heat exchanger portions of the heat recovery heat exchanger include at least (i) one portion located within a strut of the nozzle section, (ii) one portion located on or within a tail cone of the nozzle section, and (iii) one portion located on or within a nozzle case of the nozzle section.

10. The gas turbine engine of claim 1, wherein the waste heat recovery system further comprises a recuperating heat exchanger.

11. A gas turbine engine comprising:
    a nozzle section; and
    a waste heat recovery system comprising:
    a heat rejection heat exchanger thermally connected to a portion of a flow path of the gas turbine engine, the heat rejection heat exchanger being a working fluid-to-air heat exchanger;
    a recuperating heat exchanger being a working fluid-to-working fluid heat exchanger;
    a heat recovery heat exchanger arranged at the nozzle section, wherein the heat recovery heat exchanger is a working fluid-to-exhaust heat exchanger, and wherein the heat recovery heat exchanger is arranged within the nozzle section such that the heat recovery heat exchanger occupies less than an entire area of an exhaust area of the nozzle section; and
    a working fluid within the waste heat recovery system configured to flow through each of the heat rejection heat exchanger, the recuperating heat exchanger, and the heat recovery heat exchanger,
    wherein the heat recovery heat exchanger comprises a plurality of heat exchanger portions distributed about the nozzle section in a non-annular arrangement.

12. The gas turbine engine of claim 11, wherein the working fluid is supercritical $CO_2$ ($sCO_2$).

13. The gas turbine engine of claim 11, wherein a portion of the heat recovery heat exchanger is located within a strut of the nozzle section.

14. The gas turbine engine of claim 11, wherein a portion of the heat recovery heat exchanger is located on or within a tail cone of the nozzle section.

15. The gas turbine engine of claim 11, wherein a portion of the heat recovery heat exchanger is located on or within a nozzle case of the nozzle section.

16. The gas turbine engine of claim 11, wherein the waste heat recovery system further comprises:
    a turbine; and
    a compressor,
    wherein the turbine and the compressor of the waste heat recovery system are configured to generate work.

17. The gas turbine engine of claim 16, further comprising a power line operably connected to an output of the turbine of the waste heat recovery system.

18. The gas turbine engine of claim 11, wherein the heat recovery heat exchanger occupies 80% or less of an exhaust area of the nozzle section, wherein the exhaust area is defined as the area between an external surface of a tail cone of the nozzle section and an internal surface of a nozzle case of the nozzle section.

19. The gas turbine engine of claim 11, wherein the plurality of heat exchanger portions of the heat recovery heat exchanger include at least (i) one portion located within a strut of the nozzle section, (ii) one portion located on or within a tail cone of the nozzle section, and (iii) one portion located on or within a nozzle case of the nozzle section.

20. The gas turbine engine of claim 11, further comprising:
    a compressor section;
    a combustor section; and
    a turbine section,
    wherein the compressor section, the combustor section, the turbine section, and the nozzle section define a core flow path that expels through the nozzle section.

\* \* \* \* \*